United States Patent
Hasegawa (10) Patent No.: US 7,587,301 B2
(45) Date of Patent: Sep. 8, 2009

(54) USER'S REQUEST REFLECTING DESIGN SYSTEM AND METHOD THEREOF

(75) Inventor: Takumi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 829 days.

(21) Appl. No.: 09/781,253

(22) Filed: Feb. 13, 2001

(65) Prior Publication Data

US 2001/0055023 A1 Dec. 27, 2001

(30) Foreign Application Priority Data

Feb. 14, 2000 (JP) ............................. 2000-035742

(51) Int. Cl.
G06F 17/50 (2006.01)
(52) U.S. Cl. ............................. 703/1; 705/10; 705/27; 345/641
(58) Field of Classification Search ......... 345/700–752, 345/641; 703/1; 715/751; 709/204; 705/27, 705/10; 700/96, 157
See application file for complete search history.

(56) References Cited

U.S. PATENT DOCUMENTS

| | | | | | |
|---|---|---|---|---|---|
| 5,357,439 | A | * | 10/1994 | Matsuzaki et al. | 700/96 |
| 5,570,292 | A | * | 10/1996 | Abraham et al. | 700/157 |
| 5,767,848 | A | * | 6/1998 | Matsuzaki et al. | 345/751 |
| 5,826,269 | A | * | 10/1998 | Hussey | 707/10 |
| 6,236,975 | B1 | * | 5/2001 | Boe et al. | 705/7 |
| 6,256,663 | B1 | * | 7/2001 | Davis | 709/204 |
| 6,279,000 | B1 | * | 8/2001 | Suda et al. | 707/10 |
| 6,414,693 | B1 | * | 7/2002 | Berger et al. | 345/641 |
| 6,424,693 | B1 | * | 7/2002 | Weisenberger | 378/37 |
| 6,741,265 | B2 | * | 5/2004 | Ghosh et al. | 345/751 |
| 6,952,716 | B1 | * | 10/2005 | Robb et al. | 709/205 |
| 2001/0032062 | A1 | * | 10/2001 | Plaskoff et al. | 703/1 |
| 2001/0032115 | A1 | * | 10/2001 | Goldstein | 705/10 |
| 2002/0107672 | A1 | * | 8/2002 | Povich | 703/1 |

FOREIGN PATENT DOCUMENTS

| | | |
|---|---|---|
| JP | 10-105593 A | 4/1998 |
| JP | 2000-20589 A | 1/2000 |
| WO | WO 01/33831 A2 * | 10/2001 |

OTHER PUBLICATIONS

Special Reprint of Collaborative Engineering article, "CoCreate Launches Web-enabled Collaboration Solution", Nov. 1998, vol. 7, Issue 11.*

(Continued)

Primary Examiner—Kamini S Shah
Assistant Examiner—Herng-Der Day
(74) Attorney, Agent, or Firm—Sughrue Mion, PLLC (57) ABSTRACT

A design data publicizing processing unit publicizes public design data and an editing program file to users through a network connected and based on personal information recited in an electronic mail received through the network, a received mail processing unit classifies user correction data attached to the received mail and registers the data in a user correction data DB, and user correction data stored in the user correction data DB is referred to or used as design data in product designing.

18 Claims, 3 Drawing Sheets

OTHER PUBLICATIONS

Technical Factsheet OneSpace for version 4B released Dec. 1999.*
Jim Cooke; "Capturing Notes and Session Information"; OneSpace whitepaper; 2000.*
Jeff Emmel; "Integrating Collaboration Technology and Enterprise PDM"; OneSpace whitepaper; 2000.*
Arnold Mueller; "Shared Engineering"; OneSpace whitepaper; 2000.*
Michael Wendenburg; "Collaborative Engineering"; OneSpace whitepaper; 2000.*
Adam W. Grosser; "Collaborative Viewing"; OneSpace whitepaper; 2000.*
John MacKrell; "Review of CoCreate OneSpace "Acollaborative Design Infrastructure"" ; CIMdata; Jan. 1999.*
Chan et al., "A Solid Modeling Library for the World Wide Web", Computer Networks and ISDN Systems, vol. 30, Issue 20-21, Nov. 1998, pp. 1853-1863.*

* cited by examiner

FIG. 1

USER'S REQUEST REFLECTING DESIGN SYSTEM AND METHOD THEREOF

BACKGROUND OF THE INVENTION

1. Field of the Invention

The present invention relates to a user's request reflecting design system using a computer and a method thereof, and more particularly, to a user's request reflecting design system suitable for timely and accurately reflecting users' needs on products and a method thereof.

2. Description of the Related Art

In recent product development, demanded are a shorter development cycle and timely and accurately reflecting users' needs on products because of diversification of users' needs and the trend toward shorter-span transformation. In the development of personal computers, in particular, in addition to development of new products meeting a demand for increasing a processing rate of a CPU (Central Processing Unit) and the like, development incorporating various users' needs is required such as a need for operability for beginners and need for a product having an appearance as a part of interior.

Under these circumstances, in order to accurately seize these users' needs to timely incorporate the same into product design, designers have grasped users' needs by collecting data using paper such as questionnaire post cards and collecting users' opinions and demands expressed through telephone, electronic mail and the like.

The above-described conventional methods of collecting users' needs has problems such as lack of instantaneousness in reflecting users' needs on products or incapability of accurately grasping users' needs.

In data collection using questionnaire post cards, for example, it will take time before a user fills in a questionnaire post card and posts the same or a user often finds the action itself of filling in a post card too inconvenient to return the card. In data collection by gathering users' opinions and demands expressed through telephone, electronic mail and the like, requests might erroneously interpreted from words and character information at the time of reflecting them on design or users' requests might be unclear. In a case of a request for appearances of products, in particular, users' expression might too abstract to accurately incorporate users' desire into product design.

SUMMARY OF THE INVENTION

An object of the present invention, taking these conditions into consideration, is to provide a user's request reflecting design system capable of accurately grasping users' needs to timely reflect the same on products and a method thereof.

According to the first aspect of the invention, a user's request reflecting design system for timely and accurately reflecting users' requests on a product, comprises design data publicizing means for publicizing design data to users through a computer network, correction data receiving means for receiving and storing correction data as the design data corrected by a user through the computer network, and design assisting means for reflecting the correction data received by the correction data receiving means on product design.

In the preferred construction, the design data is three-dimensional data.

In another preferred construction, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal.

In another preferred construction, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal, and wherein the editing program file enables editing of three-dimensional data.

In another preferred construction, the correction data receiving means includes a data base for registering the correction data, and a received mail processing unit for receiving an electronic mail to which the correction data is attached and registering and storing the correction data in the data base.

In another preferred construction, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal, and the correction data receiving means includes a data base for registering the correction data, and a received mail processing unit for receiving an electronic mail to which the correction data is attached and registering and storing the correction data in the data base.

In another preferred construction, the correction data receiving means includes a data base for registering the correction data, and a received mail processing unit for receiving an electronic mail to which the correction data is attached and registering and storing the correction data in the data base, the received mail processing unit classifies the correction data attached and registering the correction data in the data base based on personal information of a user recited in the electronic mail.

In another preferred construction, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal, and the correction data receiving means includes a data base for registering the correction data, and a received mail processing unit for receiving an electronic mail to which the correction data is attached and registering and storing the correction data in the data base, the received mail processing unit classifies the correction data attached and registering the correction data in the data base based on personal information of a user recited in the electronic mail.

In another preferred construction, the design data publicizing processing unit includes information entry selecting means allowing a user to select either information entry in the form of a menu or transfer of the public design data and the editing program file.

In another preferred construction, the correction data receiving means includes a data base for registering the correction data, and a received mail processing unit for receiving an electronic mail to which the correction data is attached and registering and storing the correction data in the data base, and in creation of the design data by the design assisting means, the correction data registered in the data base is used.

According to the second aspect of the invention, a user's request reflecting design method of timely and accurately reflecting users' requests on a product, comprising the steps of publicizing design data to users through a computer network, receiving correction data as the design data corrected by a user through the computer network, and reflecting the correction data received on product design.

In the preferred construction, the design data publicizing step includes the step of in response to a request from a terminal connected to the computer network, transferring public design data prepared in advance to be publicized among the design data and an editing program file for editing the public design data to the terminal.

In another preferred construction, the correction data receiving step includes the step of receiving an electronic mail to which the correction data is attached and registering the correction data in a data base for registering the correction data.

In another preferred construction, the design data publicizing step includes the step of in response to a request from a terminal connected to the computer network, transferring public design data prepared in advance to be publicized among the design data and an editing program file for editing the public design data to the terminal, and the correction data receiving step includes the step of receiving an electronic mail to which the correction data is attached and registering the correction data in a data base for registering the correction data.

In another preferred construction, the correction data receiving step includes the step of receiving an electronic mail to which the correction data is attached, and classifying the correction data attached and registering the correction data in the data base based on personal information of a user recited in the electronic mail.

In another preferred construction, the design data publicizing step includes the step of in response to a request from a terminal connected to the computer network, transferring public design data prepared in advance to be publicized among the design data and an editing program file for editing the public design data to the terminal, and the correction data receiving step includes the step of receiving an electronic mail to which the correction data is attached, classifying the correction data attached and registering the correction data in the data base based on personal information of a user recited in the electronic mail.

According to another aspect of the invention, a server of a user's request reflecting design system for timely and accurately reflecting users' requests on a product, comprises design data publicizing means for publicizing design data to users through a computer network, and correction data receiving means for receiving correction data as the design data corrected by a user through the computer network and storing the correction data so as to be usable by design assisting means for reflecting the correction data on product design.

In the preferred construction, in the server of a user's request reflecting design system, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal.

In another preferred construction, in the server of a user's request reflecting design system, the correction data receiving means includes a data base for registering the correction data, and a received mail processing unit for receiving an electronic mail to which the correction data is attached and registering and storing the correction data in the data base.

In another preferred construction, in the server of a user's request reflecting design system, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal, and the correction data receiving means includes a data base for registering the correction data, and a received mail processing unit for receiving an electronic mail to which the correction data is attached and registering and storing the correction data in the data base.

In another preferred construction, in the server of a user's request reflecting design system, the correction data receiving means includes a data base for registering the correction data, and a received mail processing unit for receiving an electronic mail to which the correction data is attached and registering and storing the correction data in the data base, the received mail processing unit classifies the correction data attached and registering the correction data in the data base based on personal information of a user recited in the electronic mail.

In another preferred construction, in the server of a user's request reflecting design system, the design data publicizing means includes public design data prepared in advance to be publicized among the design data, an editing program file for editing the public design data, and a design data publicizing processing unit responsive to a request from a terminal connected to the computer network for transferring the public design data and the editing program file to the terminal, and the correction data receiving means includes a data base for registering the correction data, and a received mail processing unit for receiving an electronic mail to which the correction data is attached and registering and storing the correction data in the data base, the received mail processing unit classifies the correction data attached and registering the correction data in the data base based on personal information of a user recited in the electronic mail.

In another preferred construction, in the server of a user's request reflecting design system, the design data publicizing processing unit includes information entry selecting means allowing a user to select either information entry in the form of a menu or transfer of the public design data and the editing program file.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
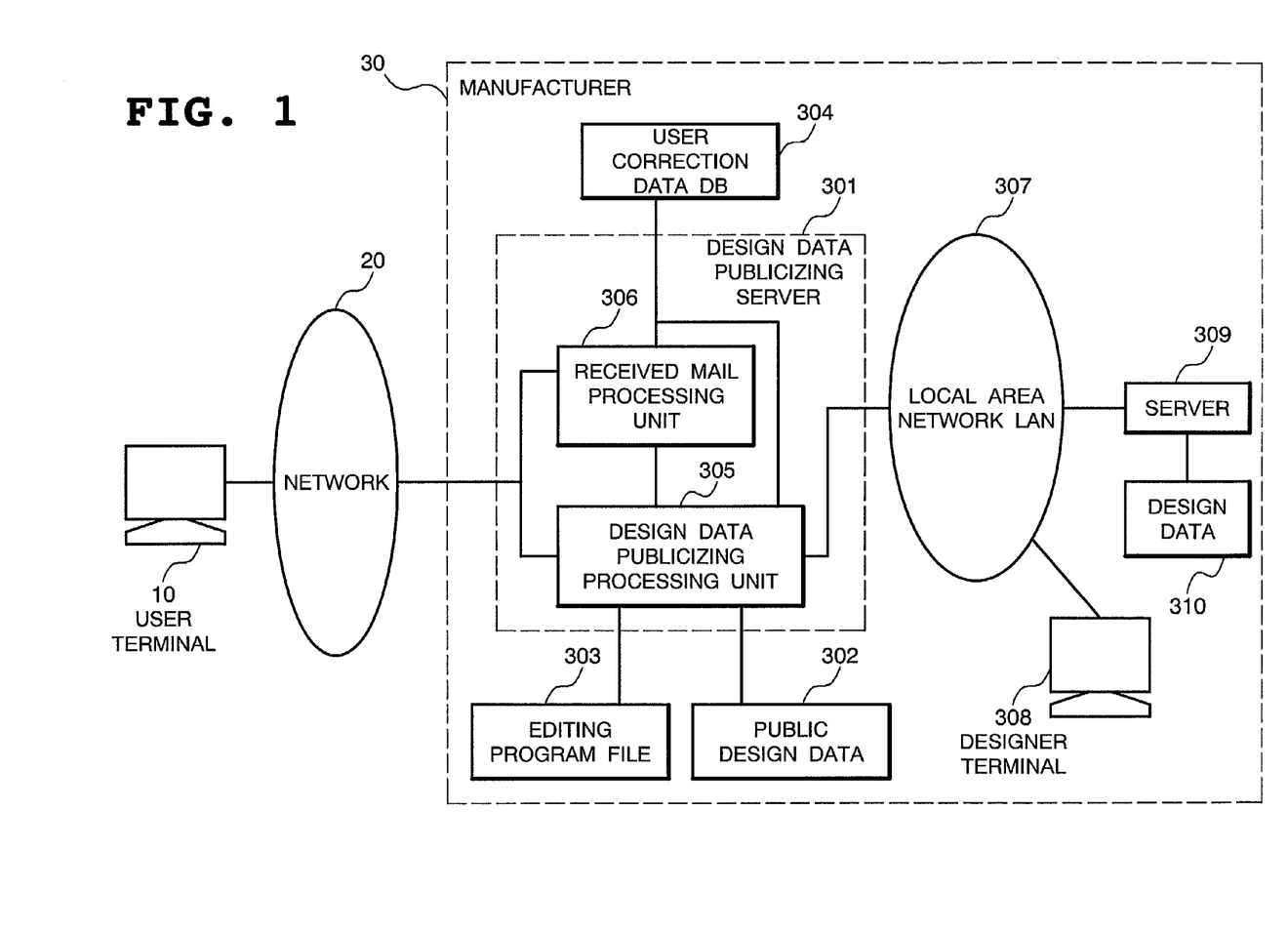
FIG. 1 is a block diagram showing a structure of a user's request reflecting design system according to a first embodiment of the present invention.

FIG. 1 is a block diagram showing a structure of a user's request reflecting design system according to the present embodiment. In FIG. 1, 30 denotes a manufacturer of a product such as a computer, 10 denotes a user terminal such as a personal computer used by a user of the product of the manufacturer 30 or a person whose has an opinion or request for the product (hereinafter referred to as a user), which are connected to a computer network (hereinafter referred to as a network) 20 called the Internet through a telephone line.

Next, arrangement in the manufacturer 30 will be described. 301 denotes a design data publicizing server connected to the network 20 through a communication line such as a leased line for executing processing such as publicizing product design data and reception of an electronic mail sent from the user terminal 10, 302 denotes public design data prepared in advance as a design data file for making products already in store public (hereinafter referred to as public design data), 303 denotes an editing program file in which an editing program for use in correcting the public design data 302 is stored, and 304 denotes a user correction data data base (hereinafter referred to as user correction data DB) having a registration table for corrected public design data (hereinafter referred to as user correction data) to be attached to an electronic mail received by the design data publicizing server 301 and for storing the registered user correction data. The public design data 302, the editing program file 303 and the user correction data DB 304 are stored in an external storage device connected to the design data publicizing server 301.

In the design data publicizing server 301, 305 denotes a design data publicizing processing unit for setting up a design data public home page to be publicized through the connected network 20 to transfer the public design data 302 and the editing program file 303, and 306 denotes a received mail processing unit for classifying received mails based on personal information recited in an electronic mail received (hereinafter referred to as received mail) through the network 20 and registering and storing user correction data attached to the received mail in question at the user correction data DB 304 based on classification results.

Personal information here includes, for example, user's age, sex, residence and the like which are information for specifying a user.

The user correction data DB 304 has a registration table classified for each user's personal information, and the received mail processing unit 306 registers attached user correction data at a registration table corresponding to each personal information described in the received mail. This arrangement enables a designer to search and obtain a request from a user (user correction data) classified according to each personal information of the user.

307 denotes a network set up in the manufacturer (hereinafter referred to as a local area network LAN), 308 denotes a designer terminal to be connected to the local area network LAN 307 such as a workstation or a personal computer that the designer uses for designing a product, 309 denotes a server for assisting designing which is to be accessed by the designer terminal 308 through the connected local area network LAN 307 provided with a design tool for product design, and 310 denotes a design data file (hereinafter referred to as design data) of a product to be stored in a storage device connected to the server 309. The design data file 310 is created by connecting the designer terminal 308 to the server 309 by the designer and using a design tool of the server 309.

With the design data publicizing server 301 connected to the local area network LAN 307, the designer terminal 308 accesses the design data publicizing server 301 through the local area network LAN 307 to read user correction data and registered data thereof stored in the user correction data DB 304.

The above-described public design data 302 is a three-dimensional data file of a structural diagram of, for example, a main body of a personal computer, a display and a keyboard and has compatibility with the design data 310. In addition, in the public design data 302, a region unchangeable by the above-described editing program 303 is set in advance. The unchangeable region is a region whose change is not allowed in terms of specifications of a product in question such as a 15-inch display screen region in a case of a structural diagram of a 15-inch display and a packaging region of keys arranged based on JIS in a case of a structural diagram of a JIS keyboard.

The above-described editing program enables editing of a three-dimensional data file and by using the editing program, a user corrects, for example, a three-dimensional structural diagram of a display into a desired configuration. User correction data corrected by the editing program has compatibility with the design data 310. In addition, a part or a region corrected by the editing program is colored differently from, for example, a part yet to be corrected in order to enable distinction from the part yet to be corrected.

In the following, operation of thus structured user's request reflecting design system according to the present embodiment will be described.

Figure 2:
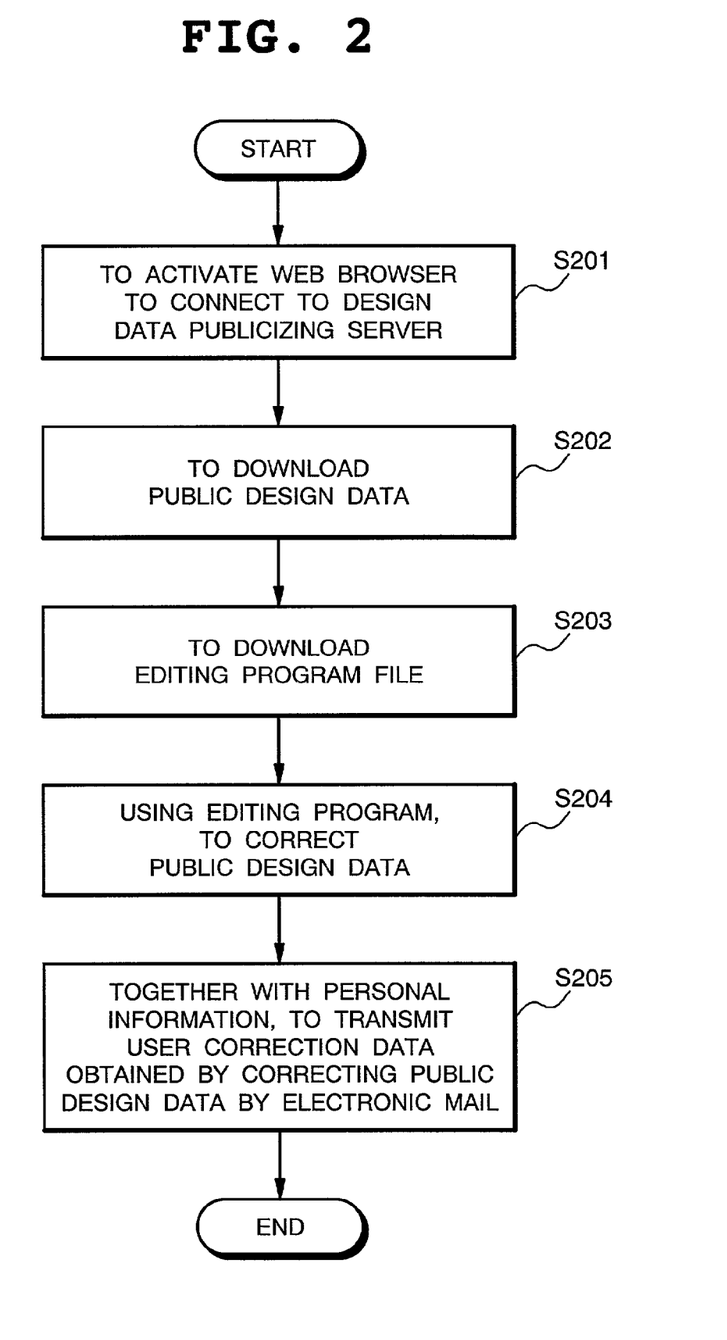
FIG. 2 is a flow chart showing a flow of processing conducted at a user terminal.

FIG. 2 is a flow chart showing a flow of processing conducted at the user terminal 10. First, with reference to the flow chart of FIG. 2, description will be made of operation conducted when a user makes a request for a product of the manufacturer 30.

First, the user activates a Web browser as a home page accessing program by the operation of the user terminal 10 to connect the user thermal 10 to the design data publicizing server 301 through the network 20 (Step S201).

Next, access a design data public home page set up by the design data publicizing processing unit 305 to request downloading of the public design data 302 of a desired product. In response to the request, the design data publicizing processing unit 305 transfers the requested public design data 302 to the user terminal 10 (Step S202). By the same procedure as that mentioned above, download the editing program file 303 to the user terminal 10 (Step S203). Then, using the editing program, the user executes correction of the downloaded public design data 302 (Step S204).

Then, the user recites personal information in a main text of an electronic mail and with user correction data which is data obtained by correcting the public design data 302 attached to the electronic mail in question, sends the mail to the design data publicizing server 301 (Step S205). The electronic mail sent from the user terminal 10 is received by the received mail processing unit 306.

The above-described recitation of personal information in a main text of an electronic mail is made by sequentially inputting with line feed, for example, user's age, sex and residential area as information for specifying a user. Residential area is entered as a prefecture for a domestic user and as a country name or an abbreviation thereof for a user in a foreign country.

Figure 3:
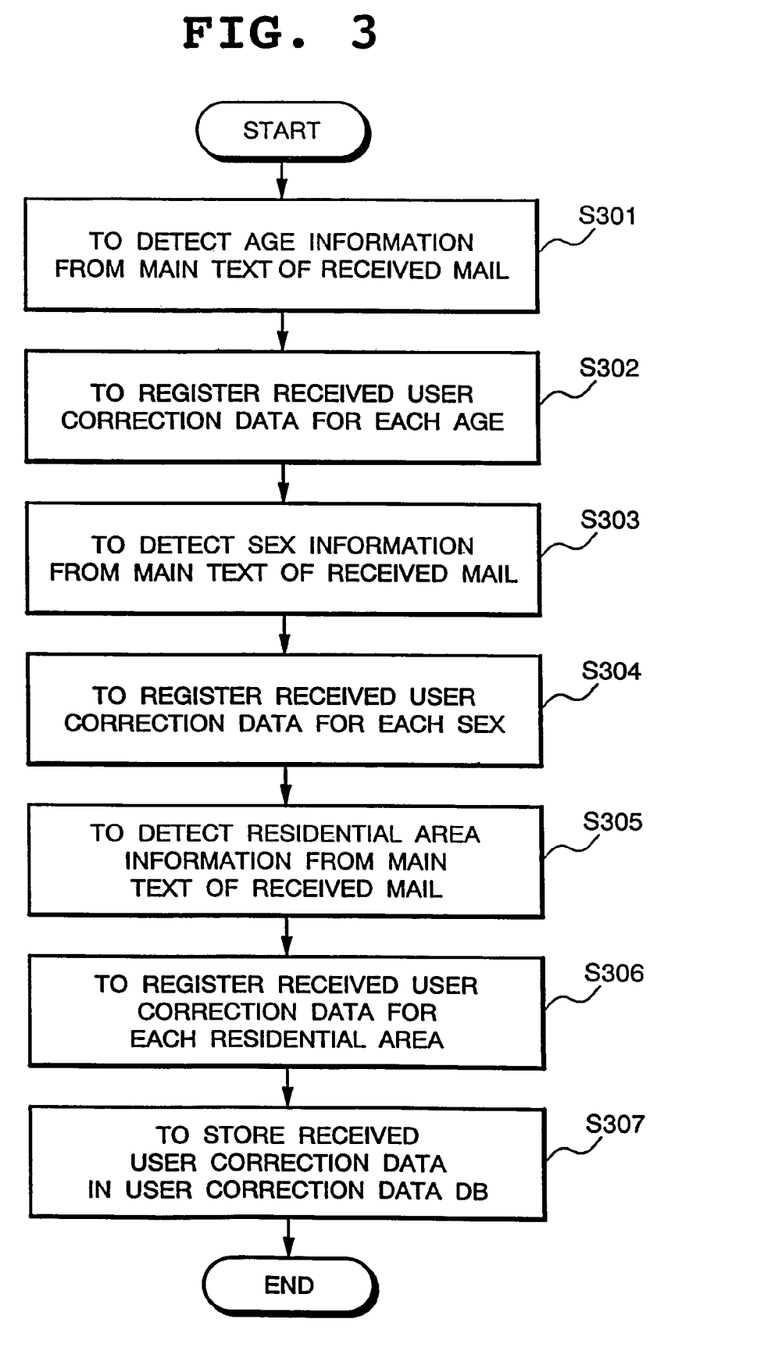
FIG. 3 is a flow chart showing a flow of processing of design data publicizing server conducted at the time of reception of an electronic mail.

Next, FIG. 3 is a flow chart showing a flow of processing of the design data publicizing server 301 conducted when the above-described electronic mail transmitted from the user is received. With reference to FIG. 3, received mail processing operation conducted by the design data publicizing server 301 will be described.

First, upon receiving an electronic mail through the network 20, the received mail processing unit 306 detects, among data recited in a main text of the received mail, first recited data as an age (Step S301). Then, register user correction data attached to the received mail at the registration table of the user correction data DB 304 corresponding to the detected age (Step S302).

Next, upon detection of a line feed of the main text, detect the subsequently recited data as a sex (Step S303). Then, register the user correction data attached to the received mail at the registration table of the user correction data DB 304 corresponding to the detected sex (Step S304). Similarly, detect data recited following the subsequent line feed detected as a residential area (Step S305) and register the user correction data attached to the received mail at the registration table of the user correction data DB 304 corresponding to the detected residential area (Step S306). Then, the received mail processing unit 306 stores the user correction data attached to the received mail in the user correction data DB 304 (Step S307).

In the above-described embodiment, a designer is allowed to refer to user correction data stored in the user correction data DB 304 by using the designer terminal 308 or use the user correction data as the design data 310 for product designing.

As a result, the number of steps of grasping users' requests to regenerate design data is reduced to enable users' requests to be more timely reflected on a product as compared with a conventional system. In addition, even with respect to a request for an appearance of a product, since user correction data has a structural diagram itself of the product corrected, it is possible to accurately incorporate a user's request indicated as a content to be corrected in the structural diagram in question into product design.

Moreover, since in the public design data 302, a region unchangeable in terms of specifications of a product is set not to be corrected even by the use of an editing program, user's correction not conforming to product specifications can be prevented.

Furthermore, because a part or a region corrected by the editing program is distinguishable from a part yet to be corrected by different coloring, designers are allowed to accurately grasp users' requests.

In addition, since the system is structured to classify a received mail based on personal information recited in a main text of the received mail and register and store user correction data attached to the received mail in the user correction data DB 304 based on the classification result, designers are allowed to search the registration table for a request from a user as a target of sales of a product being developed and obtain the same with ease. As a result, it is possible to more accurately grasp a request from a user as a target of sales and reflect the same on a product.

In the above-described embodiment, the design data publicizing processing unit 305 may be structured such that with a questionnaire entry page in the form of a menu provided in a design data public home page, a user is allowed to select either filling in the questionnaire or downloading of the above-described public design data 302 and editing program file 303.

In the above-described embodiment, the editing program enables addition of a text to the public design data in addition to editing of the public design data and a user may write its own opinion with character information into the public design data to use the data as user correction data.

While according to the above-described embodiment, the system is structured such that user correction data is attached to an electronic mail and sent to the design data publicizing server 301, it may be structured such that the design data publicizing server 301 supports an FTP (file transfer protocol) and user correction data and a text file in which personal information is recited are sent as a file.

In the above-described embodiment, although the public design data 302 is a three-dimensional data file of a structural diagram, it may be a two-dimensional data file.

As described in the foregoing, since according to the present invention, the system is provided with a design data publicizing means for publicizing design data through a computer network and a correction data reception and storage means for receiving correction data obtained by correcting the design data through the computer network and storing the same, thereby enabling a designer to use correction data as design data in product designing, users' requests can be timely and accurately reflected on a product.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A user's request reflecting design system for timely and accurately reflecting users' requests on a product, comprising:

design data publicizing means for publicizing design data to users through a computer network;

correction data receiving means for receiving and storing correction data as said design data corrected by a user through said computer network; and design assisting means for reflecting said correction data received by said correction data receiving means on product design, wherein said design data publicizing means includes public design data prepared in advance to be publicized among said design data, an editing program file for editing said public design data, and a design data publicizing processing unit responsive to a request from a terminal connected to said computer network for transferring said public design data and said editing program file to said terminal, and wherein said correction data receiving means includes a data base for registering said correction data, and a received submission processing unit for receiving an electronic submission associated with a specific user to which said correction data and additional personal information of the specific user is attached and registering and storing said correction data in said data base, said received submission processing unit classifying said attached correction data based on the additional personal information of the specific user recited in said received electronic submission and registering said correction data in said data base based on the classification results.

2. The user's request reflecting design system as set forth in claim 1, wherein said design data is three-dimensional data.

3. The user's request reflecting design system as set forth in claim 1, wherein said editing program file enables editing of three-dimensional data.

4. The user's request reflecting design system as set forth in claim 1, wherein said correction data receiving means further includes a data base for registering said correction data, and a received submission processing unit for receiving an electronic submission to which said correction data is attached and registering and storing said correction data in said data base, and in creation of said design data by said design assisting means, said correction data registered in said data base is used.

5. The user's request reflecting design system as set forth in claim 1, wherein said additional personal information of the specific user matches categories, wherein said categories are common to a group of users.

6. The user's request reflecting design system as set forth in claim 5, wherein said correction data is classified according to at least two categories.

7. The user's request reflecting design system as set forth in claim 1, wherein the electronic submission is electronic mail.

8. The user's request reflecting system as set forth in claim 1, wherein the additional personal information of the specific user is age, sex and residence of the specific user.

9. A user's request reflecting design system for timely and accurately reflecting users' requests on a product, comprising:

design data publicizing means for publicizing design data to users though a computer network;

correction data receiving means for receiving and storing correction data as said design data corrected by a user though said computer network; and design assisting means for reflecting said correction data received by said correction data receiving means on product design, wherein said design data publicizing means includes public design data prepared in advance to be publicized among said design data, an editing program file for editing said public design data, and a design data publicizing processing unit responsive to a request from a terminal connected to said computer network for transferring said public design data and said editing program file to said terminal or transferring a questionnaire entry page in the form of a menu provided in a design data public home page to said terminal, and wherein the terminal includes an information entry selecting means to selectively enter correction data either in the questionnaire entry page without downloading said public design data or by requesting transfer of said public design data from the design data publicizing processing unit to the user together with said editing program file.

10. A user's request reflecting design method of timely and accurately reflecting users' requests on a product, comprising the steps of:

publicizing design data to users through a computer network;

receiving correction data as said design data corrected by a user through said computer network; and reflecting said correction data received on product design, wherein said design data publicizing step includes the step of in response to a request from a terminal connected to said computer network, transferring public design data prepared in advance to be publicized among said design data and an editing program file for editing said public design data to said terminal, and wherein said correction data receiving step including the steps of receiving an electronic submission associated with a specific user to which said correction data and additional personal information of the specific user is attached, and classifying said attached correction data based on the additional personal information of the specific user recited in said received electronic submission and registering said correction data in a data base based on the classification results.

11. The user's request reflecting design method as set forth in claim 10, wherein said additional personal information of the specific user matches categories, wherein said categories are common to a group of users.

12. The user's request reflecting design method as set forth in claim 10, further comprising the step of searching the correction data based upon classified additional personal information.

13. The user's request reflecting design method as set forth in claim 10, wherein the electronic submission is electronic mail.

14. The user's request reflecting system as set forth in claim 10, wherein the additional personal information of the specific user is age, sex and residence of the specific user.

15. A server of a user's request reflecting design system for timely and accurately reflecting users' requests on a product, comprising:

design data publicizing means for publicizing design data to users through a computer network; and correction data receiving means for receiving correction data as said design data corrected by a user through said computer network and storing said correction data so as to be usable by design assisting means for reflecting said correction data on product design, wherein said design data publicizing means includes public design data prepared in advance to be publicized among said design data, an editing program file for editing said public design data, and a design data publicizing processing unit responsive to a request from a terminal connected to said computer network for transferring said public design data and said editing program file to said terminal; and wherein said correction data receiving means includes
a data base for registering said correction data, and
a received submission processing unit for receiving an electronic submission associated with a specific user to which said correction data and additional personal information of the specific user is attached and registering and storing said correction data in said data base,
said received submission processing unit classifying said attached correction data based on said additional personal information of the specific user recited in the received electronic submission and registering said correction data in said data base based on the classification results.

16. The server of a user's request reflecting design system as set forth in claim 15, wherein said additional personal information of the specific user matches categories, wherein said categories are common to a group of users.

17. The server of a user's request reflecting design system as set forth in claim 15, wherein the electronic submission is electronic mail.

18. The user's request reflecting system as set forth in claim 15, wherein the additional personal information of the specific user is age, sex and residence of the specific user.

* * * * *